United States Patent
Shortz (10) Patent No.: US 7,181,652 B2
(45) Date of Patent: Feb. 20, 2007

(54) SYSTEM AND METHOD FOR DETECTING AND ISOLATING CERTAIN CODE IN A SIMULATED ENVIRONMENT

(75) Inventor: Richard Shortz, Keller, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 591 days.

(21) Appl. No.: 10/337,462

(22) Filed: Jan. 7, 2003

(65) Prior Publication Data

US 2004/0133821 A1 Jul. 8, 2004

(51) Int. Cl.
*G06F 11/00* (2006.01)

(52) U.S. Cl. .......................... 714/38; 714/33

(58) Field of Classification Search ................ 714/38, 714/25, 33, 39
See application file for complete search history.

(56) References Cited

U.S. PATENT DOCUMENTS

| | | | | |
|---|---|---|---|---|
| 5,546,562 | A | * | 8/1996 | Patel ............................ 703/14 |
| 5,671,352 | A | * | 9/1997 | Subrahmaniam et al. ..... 714/41 |
| 5,737,516 | A | * | 4/1998 | Circello et al. ............... 714/38 |
| 6,052,801 | A | * | 4/2000 | Hammond et al. ........... 714/38 |
| 6,058,492 | A | * | 5/2000 | Sample et al. ................ 714/33 |
| 6,073,251 | A | * | 6/2000 | Jewett et al. .................. 714/7 |
| 6,298,320 | B1 | | 10/2001 | Buckmaster et al. |
| 6,725,449 | B1 | * | 4/2004 | Maeda et al. ............... 717/124 |

OTHER PUBLICATIONS http://en.wikipedia.org/wiki/Multiprocessor, Oct. 10, 2005.*

* cited by examiner

*Primary Examiner*—Robert Beausoliel
*Assistant Examiner*—Loan Truong (57) ABSTRACT

A system and method for detecting and isolating a code portion of a program code thread in a simulator environment wherein the code portion is operable to modify a simulated register object.

23 Claims, 4 Drawing Sheets

SYSTEM AND METHOD FOR DETECTING AND ISOLATING CERTAIN CODE IN A SIMULATED ENVIRONMENT

BACKGROUND

Architecting reliable software for high performance computing platforms has become a daunting task. In today's multiprocessor (MP) systems having a large number of processors in various architectural arrangements, the task is even more challenging. Because the teachings of the present invention will be exemplified in particular reference to MP platforms, a brief introduction thereto is set forth below.

In the most general sense, multiprocessing may be defined as the use of multiple processors to perform computing tasks. The term could apply to a set of networked computers in different locations, or to a single system containing several processors. As is well known, however, the term is most often used to describe an architecture where two or more linked processors are contained in a single or partitioned enclosure. Further, multiprocessing does not occur just because multiple processors are present. For example, having a stack of personal computers in a rack is not multiprocessing. Similarly, a server with one or more "standby" processors is not multiprocessing, either. The term "multiprocessing" is typically applied, therefore, only to architectures where two or more processors are designed to work in a cooperative fashion on a task or set of tasks.

There exist numerous variations on the basic theme of multiprocessing. In general, these variations relate to how independently the processors operate and how the workload among these processors is distributed. in loosely-coupled multiprocessing architectures, the processors perform related tasks but they do so as if they were standalone processors. Each processor is typically provided with its own private memory and may have its own mass storage and input/output (I/O). Further, each loosely-coupled processor runs its own copy of an operating system (OS), and communicates with the other processor or processors through a message-passing scheme, much like devices communicating over a local area network. Loosely-coupled multiprocessing has been widely used in mainframes and minicomputers, but the software to do so is closely tied to the hardware design. For this reason, among others, it has not gained the support of software vendors and is not widely used in today's high performance server systems.

In tightly-coupled multiprocessing, on the other hand, operation of the processors is more closely integrated. They typically share main memory, and may even have a shared cache. The processors need not be identical to one another, and may or may not perform similar tasks. However, they typically share other system resources such as mass storage and I/O. Additionally, instead of a separate copy of the OS for each processor, they run a single copy, with the OS handling the coordination of tasks between the processors. The sharing of system resources makes tightly-coupled multiprocessing platforms somewhat less expensive, and it is the dominant multiprocessor architecture in the business-class servers currently deployed.

Hardware architectures for tightly-coupled MP platforms can be further divided into two broad categories. In symmetrical MP (SMP) systems, system resources such as memory, disk storage and I/O are shared by all the microprocessors in the system. The workload is distributed evenly to available processors so that one does not sit idle while another is heavily loaded with a specific task. Further, the SMP architecture is highly scalable, i.e., the performance of SMP systems increases, at least theoretically, as more processor units are added.

In asymmetrical MP systems, tasks and resources are managed by different processor units. For example, one processor unit may handle I/O and another may handle network OS (NOS)-related tasks. Thus, it should be apparent that an asymmetrical MP system may not balance the workload and, accordingly, it is possible that a processor unit handling one task can be overworked while another unit sits idle.

SMP systems are further subdivided into two types, depending on the way cache memory is implemented. "Shared-cache" platforms, where off-chip (i.e., Level 2, or L2) cache is shared among the processors, offer lower performance in general. In "dedicated-cache" systems, every processor unit is provided with a dedicated L2 cache, in addition to its on-chip (Level 1, or L1) cache memory. The dedicated L2 cache arrangement accelerates processor-memory interactions in the multiprocessing environment and, moreover, facilitates higher scalability.

As alluded to at the beginning, designing software intended for reliable cross-platform execution on numerous MP systems available nowadays has become an arduous undertaking. Further, with ever-shrinking design/debug cycle times, software developers are continuously looking for ways to streamline the debug operations necessary to architect well-tested code, be it application software, OS software, or firmware (collectively, "applications").

A particular difficulty arises where application code includes portions that can potentially cause instabilities or other types of undesirable behavior in a system. For example, where register objects that control certain hardware functionality in a computer system are provided as a multi-component entity, each component having a value that matches or is required to be consistent with the values of the remaining components in accordance with a predetermined relationship, it is often necessary that the execution of the application code not modify one or more components of the register object entity such that it results in an invalid combination therein. Otherwise, when such invalid register objects are accessed for effectuating a hardware function, e.g., by verifying if a hardware address is within the functionality of a register object, an unstable condition can be generated in the system.

A typical solution to this problem has been what may be referred to as a "postmortem" technique wherein the user must attempt a debug process using the dump files created after the occurrence of a fatal error. Because of the transient nature of the error, it is not only tedious and time-consuming to sift through the dump files to determine the cause of the error, but it is unlikely to be found, as well. Moreover, such an instability cannot be replicated in the real world once the system crashes.

SUMMARY

Accordingly, one embodiment of the present invention advantageously provide a system and method for detecting and isolating a code portion of a program code thread in a simulator environment wherein the code portion is operable to modify a simulated register object in a manner that can give rise to potential instabilities. A set of simulator code instructions operate to determine if a first portion of the register object is enabled when the code portion attempts to modify a second portion of the register object, the first and second portions operating together to perform a specified function of a simulated target platform. Upon determining that the code portion is attempting to modify the second portion of the register object when the first portion is in enabled condition, an appropriate response action, e.g., issuing a user warning, is effectuated by the simulator code.

DETAILED DESCRIPTION OF THE DRAWINGS

Figure 1A:
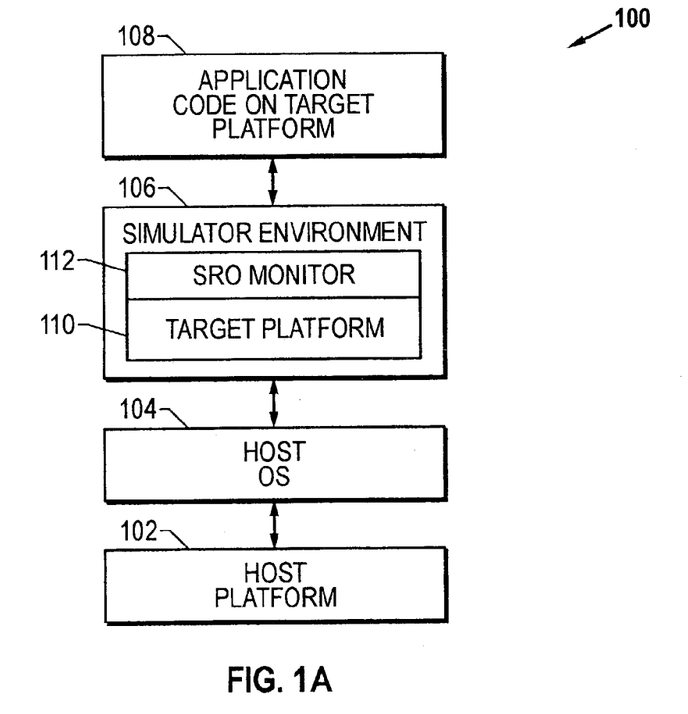
FIG. 1A depicts a functional block diagram of a system for detecting and isolating instability-causing code in a simulator environment.

In the drawings, like or similar elements are designated with identical reference numerals throughout the several views thereof, and the various elements depicted are not necessarily drawn to scale. Referring now to FIG. 1A, depicted therein is a functional block diagram of a system 100 for detecting and isolating instability-causing code in a simulated environment provided in accordance with an embodiment of the present invention. System 100 is operable to support a simulator environment 106 wherein a number of simulated register objects (SROs), each having multiple components, are provided to perform certain hardware functions with respect to a target computer platform 110. Included in system 100 is a host machine platform 102 that may be organized using any known or heretofore unknown computer architecture, wherein a host OS 104 executing thereon is operable to provide an appropriate software platform. Simulator environment 106 is thus provided as a software rendition capable of running on the host OS, and may be embodied as an architectural simulator that can simulate the target computer platform 110.

Depending on design objectives, the target platform 110 may comprise a single processor, dual processor, or multi-processor system. Further, as a multiprocessor (MP) system, the target platform 110 may include any MP architecture, e.g., selected from the group consisting of a symmetrical multiprocessor system, an asymmetrical multiprocessor system, a loosely-coupled multiprocessor system and a tightly-coupled multiprocessor system. Also, the multiple processors may be organized into a multicellular system, each cell comprising two or more processors. User application code 108 intended for execution, optimization, and maintenance on the target platform 110 is provided as a software code portion running in the simulator environment 106.

Figure 1B:
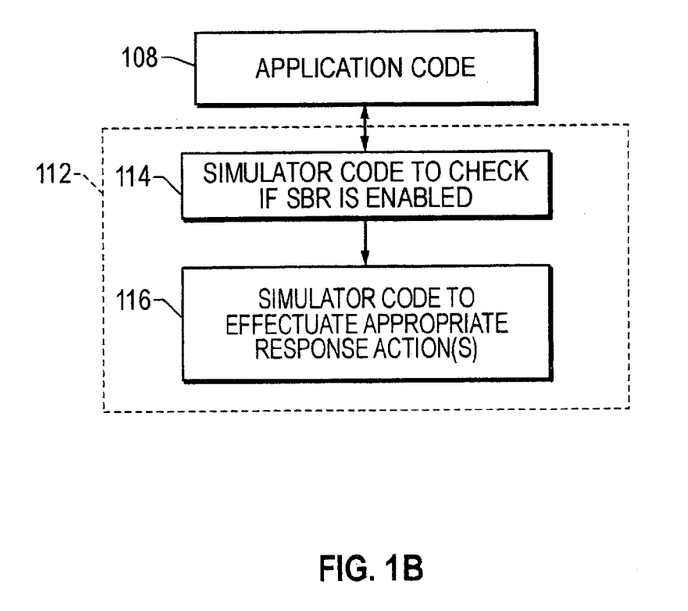
FIG. 1B depicts an embodiment of a simulator monitor for preventing code from modifying a register object without effectuating precautionary measures.

Continuing to refer to FIG. 1A, an SRO monitor 112 is provided as part of simulator code in the simulator environment for detecting and isolating portions of the user code application 108 that may cause instabilities or other types of undesirable behavior by attempting to modify at least a portion of an SRO entity independent of the contents of its remaining components. FIG. 1B depicts an embodiment of a simulator-based SRO monitor 112 for managing SRO modification by a portion of the user code (e.g., a program code thread effectuated due to the multi-threaded execution of the user application code). A simulator code portion 114 is provided which comprises instructions operating to determine if a first portion of an SRO entity (e.g., a base register portion) is enabled when the program code thread issues a transaction that attempts to modify a second portion of the SRO (e.g., a mask register portion corresponding to the base register portion), wherein the first and second portions of the SRO entity operate together to provide a particular hardware function with respect to the target platform. Another simulator code portion 116 is operable to effectuate appropriate action or actions, including providing a user warning and/or continuing to execute application code, pausing or aborting application code execution, pausing or aborting simulator code execution, or providing an option to modify the application whereby the first portion of the SRO entity is disabled prior to allowing the application program code thread to modify the contents of the second portion of the SRO. Those skilled in the art should recognize that these and other "response" actions can be realized in any known or heretofore unknown combination depending on the particular implementation. Further, the simulator code to effectuate these response actions may be provided to be modular. That is, separate software modules comprising simulator code instructions may be provided for effectuating one or more response actions. For instance, in one embodiment, a set of simulator code instructions may be provided wherein a user warning may be issued when the program code thread attempts to modify the SRO's second portion at a time when the first portion is in an enabled condition. Another set of simulator code instructions can operate such that a warning may also be provided when the application program code proceeds to disable the first portion of the SRO entity pursuant to the verification that it is enabled and the program code thread is attempting to modify the SRO's second portion.

Figure 2:
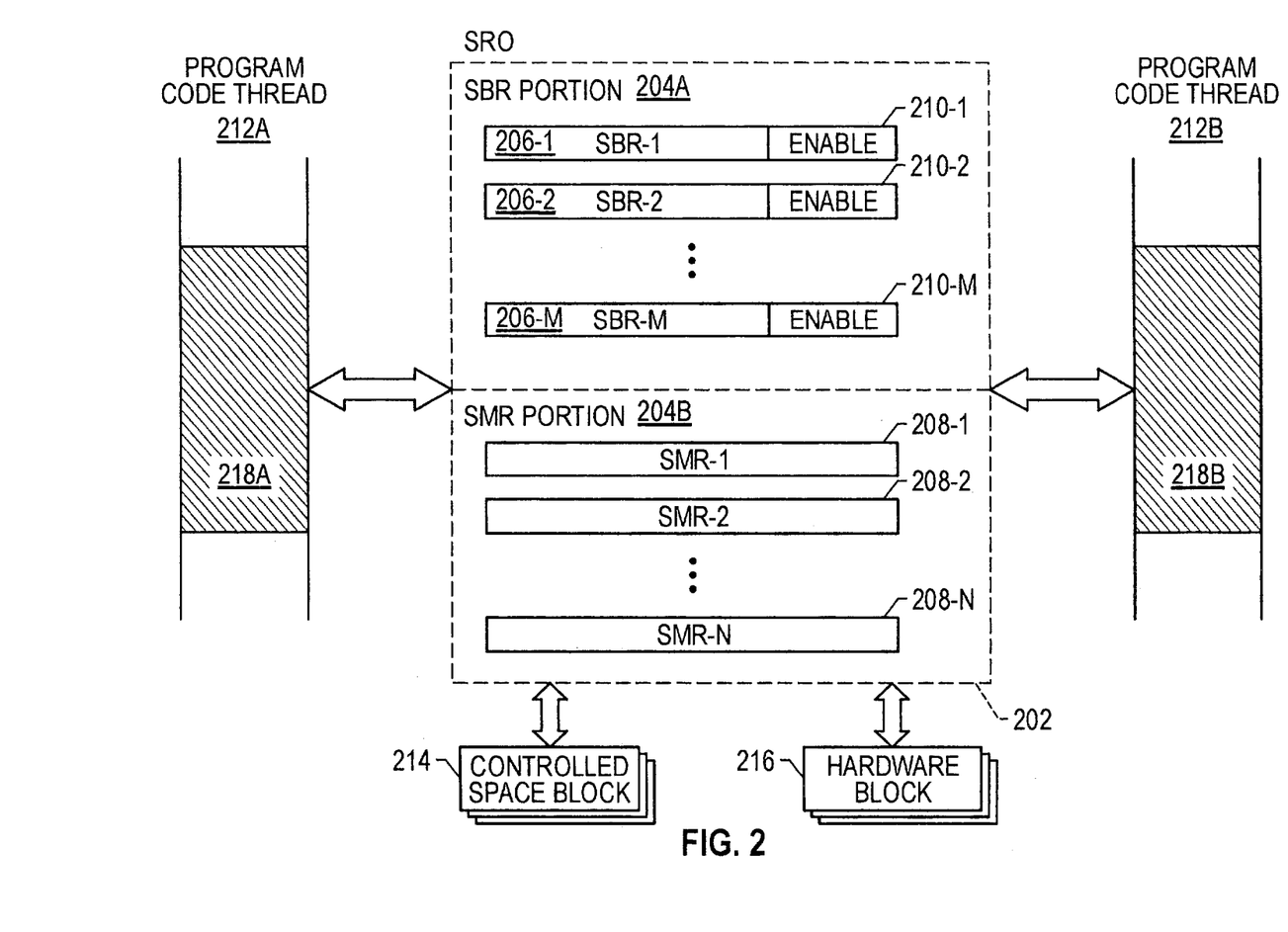
FIG. 2 depicts a high-level functional block diagram of a simulated register object operable within a target platform embodiment wherein a program code thread can access the register object for modifying its contents during program execution.

Referring now to FIG. 2, depicted therein is a high-level functional block diagram of an SRO 202 operable within a target platform embodiment wherein a program code thread can access the SRO for modifying its contents during program execution. In this embodiment, SRO 202 includes a first portion 204A comprising at least one simulated base register (SBR) and a second portion 204B comprising at least one simulated mask register (SMR). Further, each SBR itself includes an ENABLE bitfield which indicates whether the SRO entity is in an enabled or disabled condition. As pointed out earlier, the base and mask register portions operate together to effectuate a particular functionality, e.g., whether a hardware address is within the control of the function of the SRO. If the ENABLE bitfield is programmed with a particular value (e.g., where a single bit is used, it may be set), a program code thread may access the SRO to modify its SMR portion during code execution or to use the SRO functionality for some purpose.

Reference numerals 206-1 through 206-M refer to a plurality of SBRs that constitute the SBR portion, i.e., the first portion 204A, of SRO 202. Likewise, reference numerals 208-1 through 208-N refer to a plurality of SMRs that constitute the SMR portion, i.e., the second portion 204B. Each SBR includes an ENABLE field, reference numerals 210-1 through 210-M, to indicate the SRO's condition of availability. As illustrated, exemplary program code threads 212A and 212B are independently operable and include code portions 218A and 218B, respectively, to access SRO 202 in its enabled condition for effectuating a particular function with respect to one or more controlled space blocks 214 or one or more simulated hardware blocks 216. Further, the code portions 218A and 218B may also independently access the SRO to modify the contents of the SMR portion 204B during their execution. Accordingly, when code portion 218A issues a transaction that modifies the SMR contents while the SRO is enabled, there could be a mismatched or invalid relationship between the SMR and SBR portions thereof, which can give rise to an instability in the system when accessed by another code portion, e.g., code portion 218B.

Figure 3:
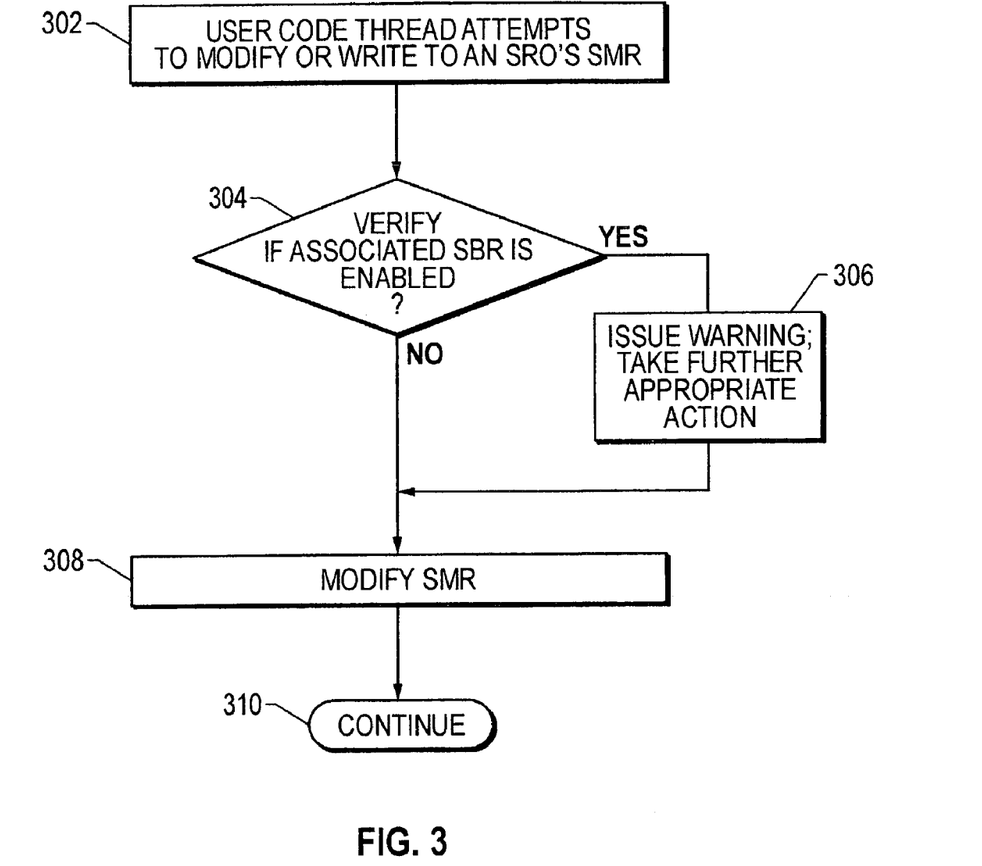
FIG. 3 is a flow chart of the various operations illustrating one embodiment of a method of the present invention for detecting and isolating instability-causing code.

FIG. 3 is a flow chart of the various operations illustrating one embodiment of a methodology of the present invention for detecting and isolating instability-causing code in a simulated environment. When a user code thread executing on a target platform issues a transaction (block 302) that attempts to modify or write to an SRO's second portion (e.g., an SMR portion such as one described above), a determination is made by an SRO monitor (decision block 304) to verify whether the SRO's matching first portion (e.g., the SBR portion corresponding to the SRO's SMR portion) is enabled. If so, a user warning may be issued to notify that modifying the SRO's contents while the entity is enabled may create a condition of instability in the system. Also, various other types of appropriate response actions such as those described hereinabove may be effectuated by the SRO monitor (block 306). Thereafter, the user code thread proceeds to modify the SMR contents (block 308), whereupon the code thread execution may continue to its next stage (block 310). It should be apparent that post-modification scenarios will generally be dependent on the response actions implemented pursuant to determining that the user code thread is attempting to modify the SRO in its enabled condition, for example: (i) terminating the user code application that initiated the modification transaction; (ii) terminating the simulator; (iii) providing an alert and continuing to execute the user code application, and the like.

Figure 4:
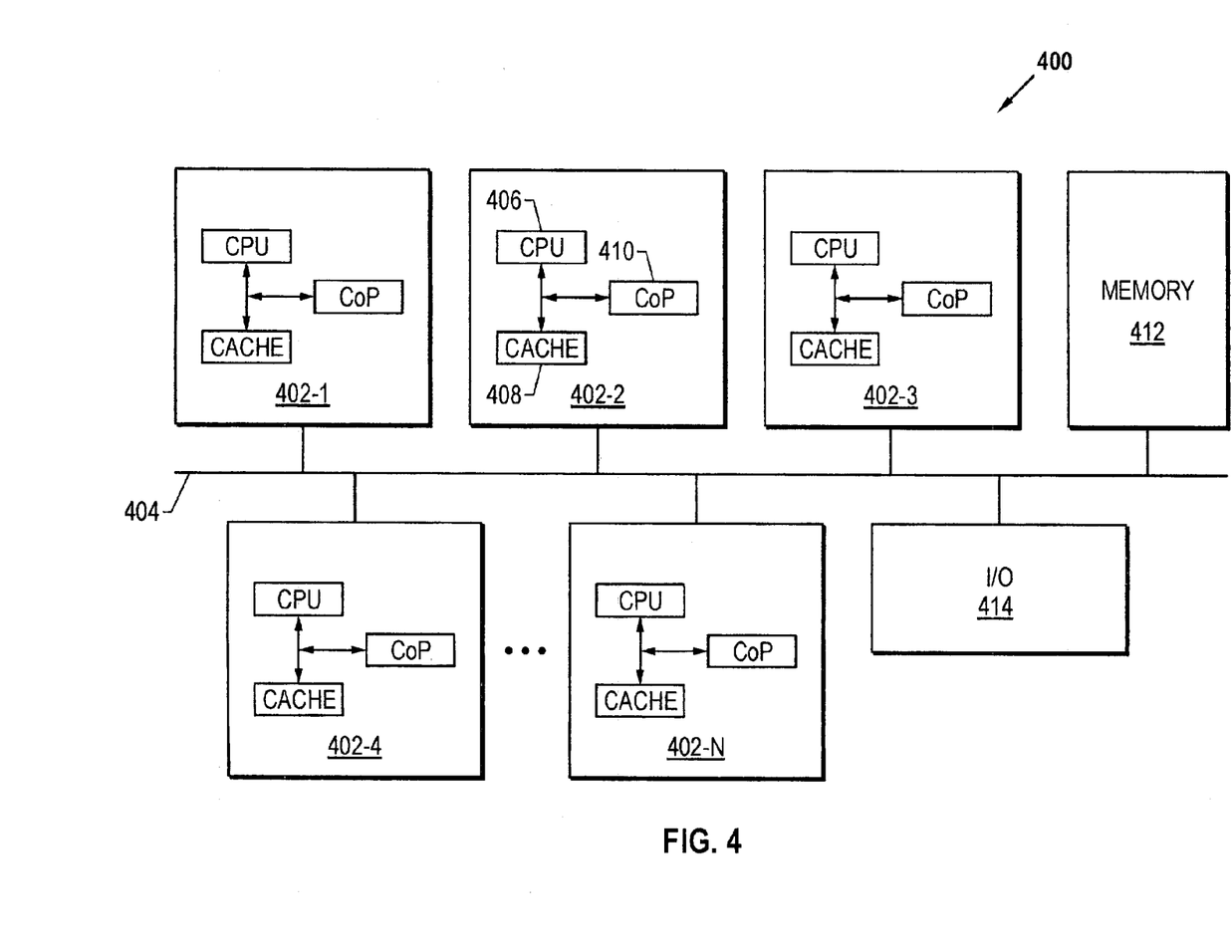
FIG. 4 depicts a block diagram of an embodiment of a target MP system simulated in an architectural simulator wherein the teachings of the present invention may be advantageously practiced.

FIG. 4 depicts a block diagram of an embodiment of a target MP system 400 simulated in an architectural simulator wherein the teachings of the present invention may be advantageously practiced. Reference numerals 402-1 through 402-N refer to a plurality of processor complexes interconnected together via a high performance, MP-capable bus 404. Each processor complex, e.g., processor complex 402-2, is comprised of at least one central processing unit (CPU) 406, a cache memory 408, and one or more coprocessors 410. In one implementation, the MP system is architectured as a tightly coupled SMP system where all processors have uniform access to a main memory 412 and any input/output (I/O) device 414 in a shared fashion. As an SMP platform, each processor has equal capability to enable any kernel task to execute on any processor in the system. Whereas threads may be scheduled in parallel fashion to run on more than one processor complex, a single kernel controls all hardware and software in an exemplary implementation of the MP system 400, wherein locking and synchronization strategies provide the kernel the means of controlling MP events.

Each processor complex may be provided with its own data structures, including run queues, counters, time-of-day information, notion of current process(es) and priority. Global data structures available for the entire MP system 400 are protected by means such as semaphores and spinlocks. Furthermore, in other implementations of the MP system, the processors may be arranged as "cells" wherein each cell is comprised of a select number of processors (e.g., four, six, or eight processors), interrupts, registers and other resources.

The architectural simulator program operable to simulate a hardware platform such as the MP system 400 may be provided with appropriate instructions to carry out the "SRO access and modification control" system and method described in greater detail hereinabove. Any software application intended for execution on the MP system may, accordingly, be debugged, tested, and optimized on the architectural simulator even before the target hardware platform is completely assembled and verified.

Based on the foregoing, those skilled in the art should appreciate that, in one embodiment, the present invention advantageously uses an architectural simulator system to detect and isolate code portions that attempt to modify multi-component register objects in such a manner as to yield invalid combinations therein. By intercepting and capturing modification attempts by a user code thread, this embodiment ensures that a modification may take place only when the register object is in a safe, disabled condition, thereby eliminating the risk of exposing it to the user space in an invalid state. Also, appropriate responses may be generated for the benefit of users and software developers when such modification attempts are issued. Based on the responses generated, accordingly, code portions in an application that cause such transactions can be timed or separated properly in the code development cycle before a target platform and associated application software are committed to production, where the ability to discover such bugs is substantially reduced while the risk of a fatal error remains significant.

Although embodiments of the invention have been particularly described with reference to certain illustrations, it is to be understood that the forms of the invention shown and described are to be treated as exemplary embodiments only. Various changes, substitutions and modifications can be realized without departing from the spirit and scope of the invention as defined by the appended claims.

What is claimed is:

1. A system for detecting and isolating a code portion of a program code thread in a simulator environment wherein said code portion is operable to modify a simulated register object, comprising:

means operating to verify if a first portion of said register object is enabled when said code portion issues a transaction attempting to modify a second portion of said register object, wherein said code portion is executed on a target platform in said simulator environment and said first and second portions of said register object operate together to effectuate a particular function with respect to said target platform; and means for effectuating a response action upon determining that said code portion is attempting to modify said second portion of said register object when said first portion is enabled.

2. The system for detecting and isolating a code portion of a program code thread in a simulator environment as recited in claim 1, wherein said means operating to verify if said first portion of said register object is enabled when said code portion attempts to modify said second portion of said register object comprises simulator code executing on a host hardware machine as part of said simulator environment.

3. The system for detecting and isolating a code portion of a program code thread in a simulator environment as recited in claim 1, wherein said means for effectuating a response action upon determining that said code portion is attempting to modify said second portion of said register object when said first portion is enabled comprises simulator code executing on a host hardware machine as part of said simulator environment.

4. The system for detecting and isolating a code portion of a program code thread in a simulator environment as recited in claim 1, wherein said response action comprises providing a user warning.

5. The system for detecting and isolating a code portion of a program code thread in a simulator environment as recited in claim 1, wherein said target platform comprises a multiprocessor computer system selected from at least one of a symmetrical multiprocessor system, an asymmetrical multiprocessor system, a loosely-coupled multiprocessor system and a tightly-coupled multiprocessor system.

6. The system for detecting and isolating a code portion of a program code thread in a simulator environment as recited in claim 1, wherein said first portion of said register object comprises at least one simulated base register.

7. The system for detecting and isolating a code portion of a program code thread in a simulated environment as recited in claim 6, wherein said second portion of said register object comprises at least one simulated mask register corresponding to said at least one simulated base register.

8. The system for detecting and isolating a code portion of a program code thread in a simulated environment as recited in claim 1, wherein said response action comprises aborting said program code thread.

9. The system for detecting and isolating a code portion of a program code thread in a simulator environment as recited in claim 1, wherein said response action comprises allowing said program code thread to disable said first portion of said register object by writing a value into a bitfield associated with said first portion and to re-enable said first portion of said register object by writing another value into said bitfield that corresponds to said modification of said second portion.

10. A method for detecting and isolating a code portion of a program code thread in a simulator environment wherein said code portion is operable to modify a simulated register object, comprising:
  determining that a first portion of said register object is enabled when a transaction is issued by said code portion executing on a target platform in said simulator environment, wherein said transaction attempts to modify a second portion of said register object; and
  effectuating a response action upon determining that said code portion is attempting to modify said second portion of said register object when said first portion is enabled.

11. The method for detecting and isolating a code portion of a program code thread in a simulator environment as recited in claim 10, wherein said response action comprises issuing a warning to a user in said simulator environment upon proceeding to modify said second portion of said register object.

12. The method for detecting and isolating a code portion of a program code thread in a simulator environment as recited in claim 10, wherein said response action comprises aborting said program code thread.

13. The method for detecting and isolating a code portion of a program code thread in a simulator environment as recited in claim 10, wherein said transaction is issued by said code portion executing on a target platform comprising a multiprocessor computer system.

14. The method for detecting and isolating a code portion of a program code thread in a simulator environment as recited in claim 13, wherein said multiprocessor computer system is selected from at lease one of a multicellular system, a symmetrical multiprocessor system, an asymmetrical multiprocessor system, a loosely-coupled multiprocessor system and a tightly-coupled multiprocessor system.

15. The method for detecting and isolating a code portion of a program code thread in a simulator environment as recited in claim 10, wherein said first portion of said register object comprises at least one simulated base register.

16. The method for detecting and isolating a code portion of a program code thread in a simulator environment as recited in claim 15, wherein said second portion of said register object comprises at least one simulated mask register corresponding to said at least one simulated base register, said first and second portions operating together to effectuate a particular function of said target platform.

17. An architectural simulator for detecting and isolating a code portion of a program code thread in a simulated environment wherein said code portion is operable to modify a simulated register object, said architectural simulator operating as code executed on a host machine, comprising:
  instructions operating to determine if a first portion of said register object is enabled when said code portion issues a transaction attempting to modify a second portion of said register object, wherein said code portion is executed on a target platform that is simulated by said architectural simulator and said first and second portions of said register object operate together to effectuate a particular function with respect to said target platform; and
  instructions for effectuating a response action upon determining that said code portion is attempting to modify said second portion of said register object when said first portion is enabled.

18. The architectural simulator for detecting and isolating a code portion of a program code thread in a simulated environment as recited in claim 17, wherein said response action comprises issuing a warning to a user in said environment upon proceeding to modify said second portion of said register object.

19. The architectural simulator for detecting and isolating a code portion of a program code thread in a simulated environment as recited in claim 17, wherein said response action comprises aborting said program code thread.

20. The architectural simulator for detecting and isolating a code portion of a program code thread in a simulated environment as recited in claim 17, wherein said code portion issues a transaction on a target platform comprising a multiprocessor computer system.

21. The architectural simulator for detecting and isolating a code portion of a program code thread in a simulated environment as recited in claim 20, wherein said multiprocessor computer system is selected from at least one of a multicellular system, a symmetrical multiprocessor system, an asymmetrical multiprocessor system, a loosely-coupled multiprocessor system and a tightly-coupled multiprocessor system.

22. A computer system, comprising:
  an Operating System (OS) operable to support a architectural simulator for simulating a target platform having at least one processor, said architectural simulator for detecting and isolating a code portion of a program code thread in said simulated target platform environment wherein said code portion is operable to modify a simulated register object, said architectural simulator operating as code executed on said computer system;

a module executing on said computer system for to determine if a first portion of said register object is enabled when said code portion issues a transaction attempting to modify a second portion of said register object, wherein said code portion is executed on said simulated target platform and said first and second portions of said register object operate together to effectuate a particular function with respect to said target platform; and a module executing on said computer system for for effectuating a response action upon determining that said code portion is attempting to modify said second portion of said register object when said first portion is enabled.

23. A computer-readable medium operable with a computer system, said computer-readable medium having stored thereon instructions operable with an architectural simulator supported by said computer system, said architectural simulator for detecting and isolating a code portion of a program code thread in a simulated target platform wherein said code portion is operable to modify a simulated register object, said medium comprising:

instructions operating to determine if a first portion of said register object is enabled when said code portion issues a transaction attempting to modify a second portion of said register object, wherein said code portion is executed on said simulated target platform and said first and second portions of said register object operate together to effectuate a particular function with respect to said target platform; and instructions for effectuating a response action upon determining that said code portion is attempting to modify said second portion of said register object when said first portion is enabled.

* * * * *

UNITED STATES PATENT AND TRADEMARK OFFICE
CERTIFICATE OF CORRECTION

| | |
|---|---|
| PATENT NO. | : 7,181,652 B2 |
| APPLICATION NO. | : 10/337462 |
| DATED | : February 20, 2007 |
| INVENTOR(S) | : Richard Shortz |

Page 1 of 1

It is certified that error appears in the above-identified patent and that said Letters Patent is hereby corrected as shown below:

In column 8, line 1, in Claim 14, delete "lease" and insert -- least --, therefor.

In column 9, line 10, in Claim 22, after "system" delete "for".

Signed and Sealed this

Eleventh Day of November, 2008

JON W. DUDAS
*Director of the United States Patent and Trademark Office*

UNITED STATES PATENT AND TRADEMARK OFFICE
CERTIFICATE OF CORRECTION

PATENT NO.        : 7,181,652 B2             Page 1 of 1
APPLICATION NO. : 10/337462
DATED              : February 20, 2007
INVENTOR(S)       : Richard Shortz

It is certified that error appears in the above-identified patent and that said Letters Patent is hereby corrected as shown below:

In column 8, line 1, in Claim 14, delete "lease" and insert -- least --, therefor.

In column 9, line 10, in Claim 22, after "system" delete "for".

Signed and Sealed this

Second Day of December, 2008

JON W. DUDAS
*Director of the United States Patent and Trademark Office*